US008394165B2

(12) United States Patent
Haussner et al.

(10) Patent No.: US 8,394,165 B2
(45) Date of Patent: Mar. 12, 2013

(54) ARRANGEMENT OF AN AIR FILTER AND A DIAPHRAGM CARBURETTOR

(75) Inventors: Torsten Haussner, Geesthacht (DE); Harald Krause, Hamburg (DE)

(73) Assignee: DOLMAR GmbH, Hamburg (DE)

( * ) Notice: Subject to any disclaimer, the term of this patent is extended or adjusted under 35 U.S.C. 154(b) by 778 days.

(21) Appl. No.: 12/165,050

(22) Filed: Jun. 30, 2008

(65) Prior Publication Data

US 2009/0007531 A1 Jan. 8, 2009

(30) Foreign Application Priority Data

Jul. 5, 2007 (DE) ..................... 20 2007 009 475 U

(51) Int. Cl.

*B01D 39/00* (2006.01)
*B01D 46/00* (2006.01)
*B01D 47/00* (2006.01)
*F02M 37/00* (2006.01)
*F02M 69/02* (2006.01)
*F02M 7/24* (2006.01)

(52) U.S. Cl. ............................ 55/495; 261/35; 123/438

(58) Field of Classification Search .................... 55/495, 55/498; 261/35; 123/438, 440
See application file for complete search history.

(56) References Cited

U.S. PATENT DOCUMENTS 4,814,114 A * 3/1989 Charmley ....................... 261/35
4,944,272 A * 7/1990 Carlsson et al. .............. 123/438
5,890,699 A * 4/1999 Sugihara et al. .............. 251/309
6,079,697 A * 6/2000 Tuggle et al. ................... 261/35
6,328,288 B1 * 12/2001 Gerhardy ........................ 261/35
6,494,180 B1 * 12/2002 Schlossarczyk .............. 123/392
2001/0007251 A1 * 7/2001 Hehnke .......................... 123/588
2002/0100437 A1 * 8/2002 Hettmann ....................... 123/68
2002/0100438 A1 * 8/2002 Raffenberg et al. ........ 123/73 A
2003/0116870 A1 * 6/2003 Nickel ........................... 261/23.2

FOREIGN PATENT DOCUMENTS

DE 3839163 A1 6/1989
DE 3901628 A1 1/1990
DE 4305206 A1 8/1993
DE 9420396 U1 12/1994
DE 102005037702 A1 2/2007
EP 1243784 A2 9/2002

OTHER PUBLICATIONS

Gesell et al., English Translation of DE 102005037702, Germany.*

* cited by examiner

*Primary Examiner* — Amber Orlando
(74) *Attorney, Agent, or Firm* — Kelly & Kelley, LLP

(57) ABSTRACT

A diaphragm carburettor is connected via a suction port with the clean air side of an air filter. A regulating chamber with a fuel chamber is connected with the suction port, in which the fuel chamber is acted upon with underpressure from the suction port and is separated from a compensation chamber by a regulating diaphragm formed to control the fuel supply to the fuel chamber. The compensation chamber is connected via a compensation path with the clean air side of the air filter and/or with the suction port so that pressure vibrations are reduced in the compensation chamber. A control and/or regulating element associated with the compensation path alters the length and/or the diameter of the compensation path.

11 Claims, 6 Drawing Sheets

ARRANGEMENT OF AN AIR FILTER AND A DIAPHRAGM CARBURETTOR

TECHNICAL FIELD

The present invention concerns an arrangement of at least one air filter and at least one diaphragm carburettor to provide a fuel/air mixture, in which the diaphragm carburettor is connected via at least one suction port with the clean air side of the air filter and via at least one regulating chamber with a fuel chamber which is connected with the suction port, in which the fuel chamber is acted upon by under pressure from the suction port and is separated from at least one compensation chamber by at least one regulating diaphragm which is formed to control the fuel supply to the fuel chamber, and in which the compensation chamber is connected via at least one compensation path with at least one pulsating pressure source, in particular with the clean air side of the air filter.

PRIOR ART

A diaphragm carburettor of the type initially mentioned is known from the publication DE 39 03 192 A1. Diaphragm carburettors are used predominantly in small engines in hand-steered and/or offroad working equipment, because they can be operated irrespective of position.

This mode of operation of the diaphragm carburettor irrespective of position is achieved in that the fuel quantity dosing does not take place by a float in a float chamber as in other carburettors, but rather by a control with a flexible diaphragm, a so-called regulating diaphragm or control diaphragm, which is connected on one side with the underpressure in the suction port and on the other side with a compensation pressure, for example the ambient air pressure (publication DE 31 27 516 A1) and/or with the pressure of the clean air side of an air filter (publication DE 39 03 192 A1) and/or with the pressure of the suction port (DE 101 04 445 A1) and/or with the air pressure of the crankcase of the engine (publication DE 30 45 976 C2 and DE 39 01 628 A1).

Therefore, on the one hand, a fuel pump for the supply of fuel from a fuel tank into a fuel chamber and on the other hand a control for the admeasurement of the quantity of fuel are integrated into the diaphragm carburettor. This controlling region is sealed with respect to the environment by the regulating diaphragm, with the regulating diaphragm forming an intermediate wall between the fuel-filled fuel chamber and a compensation chamber. The side of the regulating diaphragm facing the fuel chamber is therefore acted upon with the under pressure of the suction tract and the side of the regulating membrane facing the compensation chamber is acted upon with the pressure of the compensation chamber (compensation pressure).

If the pressure ratio acting on the regulating diaphragm alters by various influences, the position of the regulating diaphragm is changed. This changes the admeasurement of the fuel in the carburettor and therefore the composition of the fuel/air mixture provided by the diaphragm carburettor.

In order to prevent an engine, equipped with a diaphragm carburettor, from being made lean under full load and with a falling rotation speed, because an overproportionate amount of fuel-free air is supplied, in a diaphragm carburettor described in the publication DE 101 04 445 A1 the compensation chamber is connected via a compensation path with a pressure source pulsating as a function of the engine rotation speed. Such a pulsating pressure source can for example, be the suction port, the air filter or the crankcase of the engine.

By means of this compensation path, a delayed retransmission occurs of the pressure of the pressure source, for example of the under pressure of the clean air side of the air filter, to the compensation chamber, so that long-term changes to the pressure of the pressure source lead to corresponding pressure changes on the dry side of the diaphragm.

A connection of the compensation chamber with the filter chamber, a so-called filter compensation, in addition prevents the ratio of the pressure in the fuel chamber to the pressure in the compensation chamber from rising with an increasing contamination of the air filter, and a richer fuel/air mixture from being formed undesirably.

Diaphragm carburettors with such a filter compensation are known for example from the publications DE 44 19 084 A1, DE 196 04 288 C1, DE 299 22 748 U1, DE 101 04 445 A1, U.S. Pat. No. 3,085,791A and DE 39 03 192 A1.

This pressure compensation acts over the entire rotation speed range in which an apparatus equipped with such a diaphragm carburettor is operated. Owing to the structural conditions, however, in the pulsating pressure source, therefore for example in the air filter and hence in the region of the filter compensation, undesired pressure vibrations can occur, in particular undesired resonance vibrations, of the sucked in air. These vibrations then have a retroactive effect on the admeasurement of the quantity of fuel in the diaphragm carburettor over the compensation path or flow channel.

A disadvantageous change to the composition of the fuel/air mixture provided by the carburettor leads, in turn, to critical engine parameters, in particular to reduced exhaust gas quality, to increased fuel consumption and to reduced engine performance.

ILLUSTRATION OF THE INVENTION

Problem, Solution, Advantages

Proceeding from the disadvantages and shortcomings set out above, and with an appreciation of the outlined prior art, the present invention is based on the problem of further developing an arrangement of the type initially mentioned, so that pressure vibrations, in particular resonance vibrations are prevented in the compensation chamber, in particular that despite air vibrations occurring in the pulsating pressure source, an optimum provision of the fuel/air mixture takes place, in particular an optimum admeasurement of the fuel quantity.

This problem is solved by an arrangement with the features indicated in Claim 1, and by a two-stroke engine with the features indicated in Claim 9. Advantageous developments and expedient further developments of the present invention are characterized in the respective sub-claims.

Proceeding from the problem that pressure vibrations, in particular resonance vibrations, transferred by the compensation path into the compensation chamber, have a highly negative effect on the control of the fuel supply to the fuel chamber, because the fuel supply is pressure-controlled, the present invention is fundamentally based on reducing these undesired pressure vibrations by means of a compensation path of defined dimensions, in particular of defined length and/or of defined diameter. The present invention is therefore based on varying or altering the dimensioning of the compensation path, in particular playing with the dimensioning of the compensation path, in order to achieve particular regulating effects.

In the arrangement according to the present invention, by changing the dimensioning of the compensation path, air vibrations are reliably prevented from occurring in the compensation chamber of the diaphragm carburettor and from making lean or over-enriching the provided fuel/air mixture.

To change the dimensioning of the compensation path, the control- and/or regulating element advantageously has at least one path element which is able to be connected with the compensation path and is movable relative to the compensation path.

The compensation path may be a line, a substantially flexible or a substantially rigid tube, a pipe, a bore or any desired connection between the compensation chamber and the pulsating pressure source, with the pulsating pressure source pulsating for example as a function of the engine rotation speed of a two-stroke engine associated with the arrangement.

By means of the compensation path, the compensation chamber is acted upon by the pressure of the pulsating pressure source, for example with the underpressure of the suction port and/or the clean air side of the air filter and/or of the crankcase or else with atmospheric pressure. For this purpose, according to an advantageous embodiment of the present invention, the compensation path connects the compensation chamber with the clean air side of the air filter.

Here, for example as described in the publication DE 31 27 516 C2, in the connection of the air filter with the external atmosphere, a change-over valve can be provided, by which the air filter is optionally able to be connected with the crankcase of the internal-combustion engine or with the atmosphere.

The influence of the compensation path is advantageously defined so that a distinct effect occurs on the admeasurement of the fuel at various engine rotation speeds. For this purpose, the control- and/or regulating element can be additionally constructed to control the dimensioning of the compensation path as a function of the operating behaviour of the diaphragm carburettor, in particular of load and/or rotation speed and/or of the intensity of the underpressure in the suction port and/or of the pressure in the pressure source.

Furthermore, in an expedient development of the present invention, the position of the fuel curve can be optimized by means of the compensation path, in order to favourably influence particular parameters relating to the engine.

In an advantageous further development of the invention, the ratio of the cross-section of the compensation port to the suction cross-section or to the smallest diameter of the suction port, constructed in the form of a Venturi tube, is not greater than one to twenty. The ratio of the length of the compensation path to the suction diameter in the Venturi is preferably at least one to eight.

The control- and/or regulating element can be advantageously constructed as a switching arrangement. Such a switchable change to the dimensioning of the compensation path makes possible an additional change, dependent on load and/or rotation speed, of the fuel characteristic of the diaphragm carburettor.

Thus, the switchability to different dimensions makes it possible to adapt the diaphragm carburettor to quite specific operating states. For example, on starting or when idling or in a particular partial load range, a predetermined length of the compensation path can be set and then, on exceeding an operating point, a different length (shorter or longer) can become effective by switching over, whereby then the operating behaviour changes accordingly. Contraction effects can occur here as an additional limiting quantity and can be used in a suitable manner.

To provide a switchable compensation path, in a preferred form of construction of the present invention the switching arrangement is formed to switch to and fro between at least a first switching position and at least one further, in particular second, switching position, with the length of the compensation path being able to be altered, by the compensation path
- being connected in the first switching position with at least one further compensation path element associated with the compensation path, and
- being separated from the further compensation path element in the second switching position.

To regulate the switching position, advantageously at least one sensor and/or at least one throttle valve sensor and/or at least one temperature sensor is associated with the switching arrangement.

The control- and/or regulating element can be designed to switch over between at least two different dimensions, in particular lengths and/or diameters, of the compensation path. Alternatively however, the control- and/or regulating element can also be designed to bring about a variable or continuous dimension change of the compensation path.

The present invention concerns in addition a two-stroke engine, in particular as a driving motor in a small vehicle or in a hand-steered and/or portable working apparatus, for example in a blower, in a free-cutting apparatus, in a hedge cutter, in a motor(chain)saw, in a motor scythe, in a lawnmower, in a cutting-off machine or in suchlike, with at least one arrangement according to the type set forth above.

The two-stroke engine can have at least one solenoid valve to control the control- and/or regulating element, associated with the compensation path, as a function of the load and/or rotation speed of the two-stroke engine.

Alternatively or in addition to this, the control- and/or regulating element associated with the compensation path can be controlled by means of the crankcase pressure, in particular by means of the underpressure produced in the crankcase of the two-stroke engine.

The present invention relates, furthermore, to a small vehicle or a hand-steered or portable working apparatus, for example a blower, a free-cutting apparatus, a hedge cutter, a motor(chain)saw, a motor scythe, a lawnmower, a cutting-off machine or suchlike, having at least one two-stroke engine according to the type set forth above.

The present invention finally relates to a method for providing a fuel/air mixture by means of at least one diaphragm carburettor, which is connected via at least one suction port with the clean air side of at least one air filter,
- in which the suction port is acted upon
- with air from the clean air side of the air filter and
- with fuel from at least one fuel chamber associated with the diaphragm carburettor,
- in which the fuel supply for the fuel chamber is controlled by means of at least one regulating diaphragm arranged between the fuel chamber and at least one compensation chamber, and
- in which the compensation chamber is acted upon via at least one compensation path with the pressure at least of a pulsating pressure source, in particular with the underpressure of the clean air side of the air filter.

According to the invention, the dimensioning, in particular the length and/or the diameter, of the compensation path, is regulated in particular as a function of the frequency and/or the amplitude of pressure vibrations occurring in the pressure source, in particular is changed by means of at least one control- and/or regulating element associated with the compensation path. To determine the pressure vibrations in the pulsating pressure source, the arrangement expediently has at least one measurement probe.

The arrangement operating by the method according to the present invention, because it can be operated in every position, is suited in a particular manner to use in a two-stroke engine.

Such a two-stroke engine is again, owing to its low weight per horsepower, advantageously able to be used as a driving motor in a small vehicle or in a hand-steered and/or portable working apparatus. For example, the arrangement according to the present invention can be used in a two-stroke engine in a blower, in a free-cutting apparatus, in a hedge cutter, in a motor(chain)saw, in a motor scythe, in a lawnmower or in a cutting-off machine.

BRIEF DESCRIPTION OF THE DRAWINGS

As already discussed above, there are various possibilities for advantageously forming and further developing the teaching of the present invention. For this, on the one hand reference is to be made to the claims respectively subordinate to Claim 1 and to Claim 9, and on the other hand further developments, features and advantages of the present invention are explained in further detail below with the aid of the illustrated two example embodiments. In a purely diagrammatic illustration, there are shown:

BEST WAY TO CARRY OUT THE INVENTION

Figure 1:
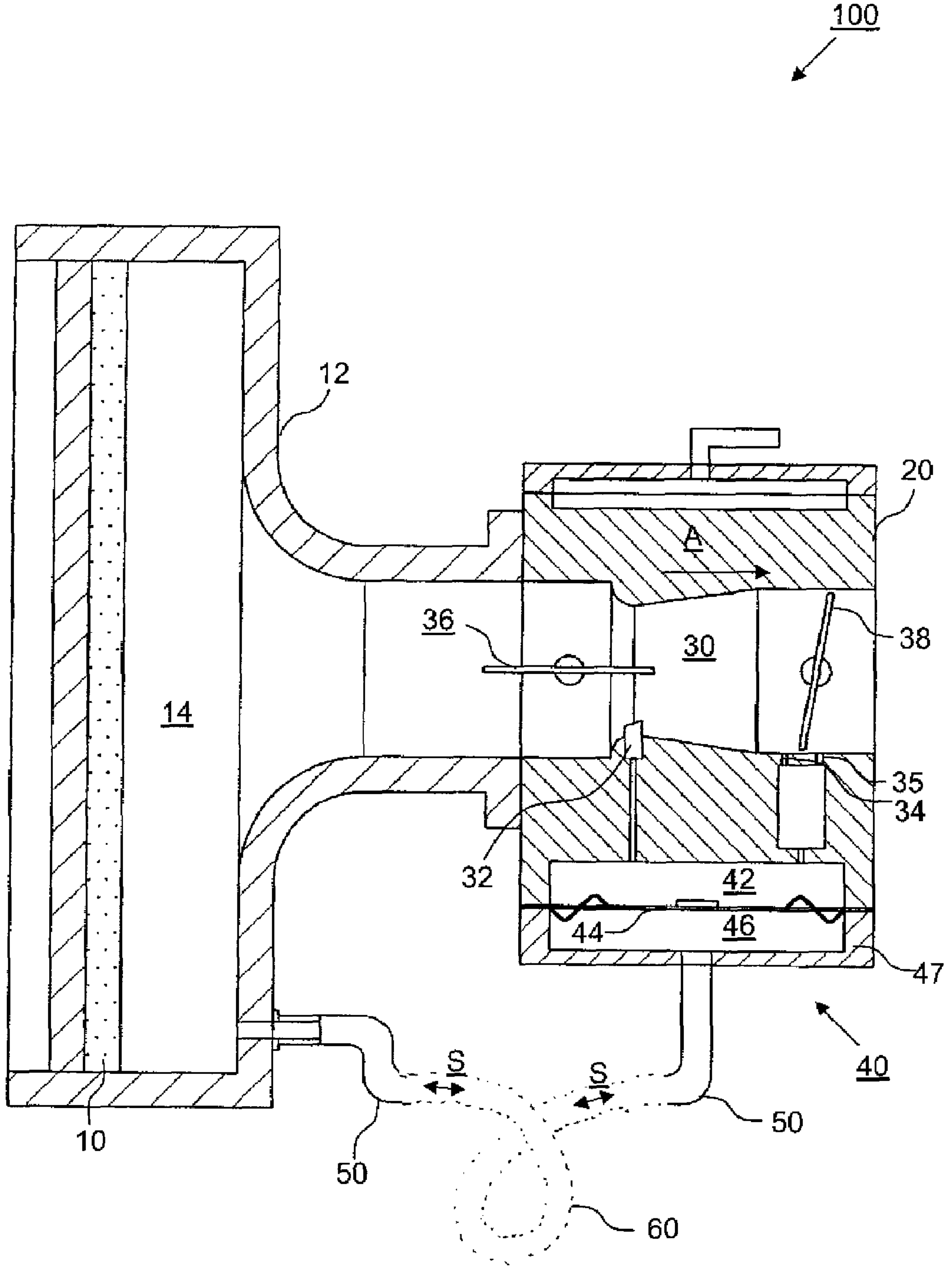
FIG. 1 in sectional illustration an abstracted illustration for an arrangement according to the present invention, which operates by the method according to the present invention, FIG. 2 in sectional illustration a first example embodiment of the arrangement of FIG. 1 with a short compensation path, FIG. 3 in sectional illustration the first example embodiment of the arrangement of FIG. 1 with a lengthened compensation path, FIG. 4 in sectional illustration a second example embodiment of the arrangement of FIG. 1 with a short compensation path, FIG. 5 in sectional illustration the second example embodiment of the arrangement of FIG. 1 with a lengthened compensation path, and FIG. 6 in diagrammatic illustration the influencing of the fuel characteristic of a diaphragm carburettor by means of the compensation path illustrated in FIGS. 1 to 5.

FIG. 1 shows an arrangement 100 of an air filter 10 and a diaphragm carburettor 20 to provide a fuel/air mixture. In the housing of the diaphragm carburettor 20, a suction port 30 is formed which sucks in ambient air filtered via an air filter 10, in which the air supply is regulated via at least one throttle valve 38 and at least one starter valve or choke valve 36. The suction direction (reference A) is illustrated in FIGS. 1 to 5 by means of an arrow.

In addition, the suction port 30 sucks in fuel via at least one inlet opening 32, 34, from a fuel chamber 42. The fuel chamber 42 is associated with a regulating chamber 40 of the diaphragm carburettor 20 and is separated from a compensation chamber 46 by means of a flexible diaphragm 44, a so-called regulating diaphragm. The regulating diaphragm 44 controls via an inflow valve the fuel inflow from a fuel tank into the fuel chamber 42. For pressure equalization, the compensation chamber 46 is connected via a compensation path 50 with the clean air side 14 of the air filter 10. The pressure equalization, due to compensation path 50, in particular at the first inlet opening 32, via which the majority of the fuel is supplied to the suction port 30, proves to be particularly advantageous.

Owing to the connection of the compensation path 50 with a pulsating pressure source 14, 30, no directed flow prevails in the compensation path 50. The flow in the compensation path 50 is therefore marked by means of arrows on both sides with the reference S.

In addition, optionally the compensation chamber 46 can be vented via a wall opening, for example via an opening in the regulating chamber cover 47, to the atmosphere, so that also the ambient pressure acts on the regulating diaphragm 44.

In order to prevent undesired pressure vibrations, in particular resonance vibrations, from being transferred from the clean air side 14 of the air filter 10 into the compensation chamber 46, in accordance with the two embodiments illustrated in FIGS. 1 to 5 the dimensioning, in particular the length and/or the diameter, of the compensation path 50 is altered as a function of the frequency and/or the amplitude of the pressure vibrations of the air filter 10.

The present invention is therefore based on playing with the dimensioning of the compensation path 50 in order to achieve particular regulating effects. This is illustrated in FIG. 1 by the compensation path 50, in dashed lines, formed as a tube line. This tube line 50 can of course be constructed in a different length.

Figure 6:
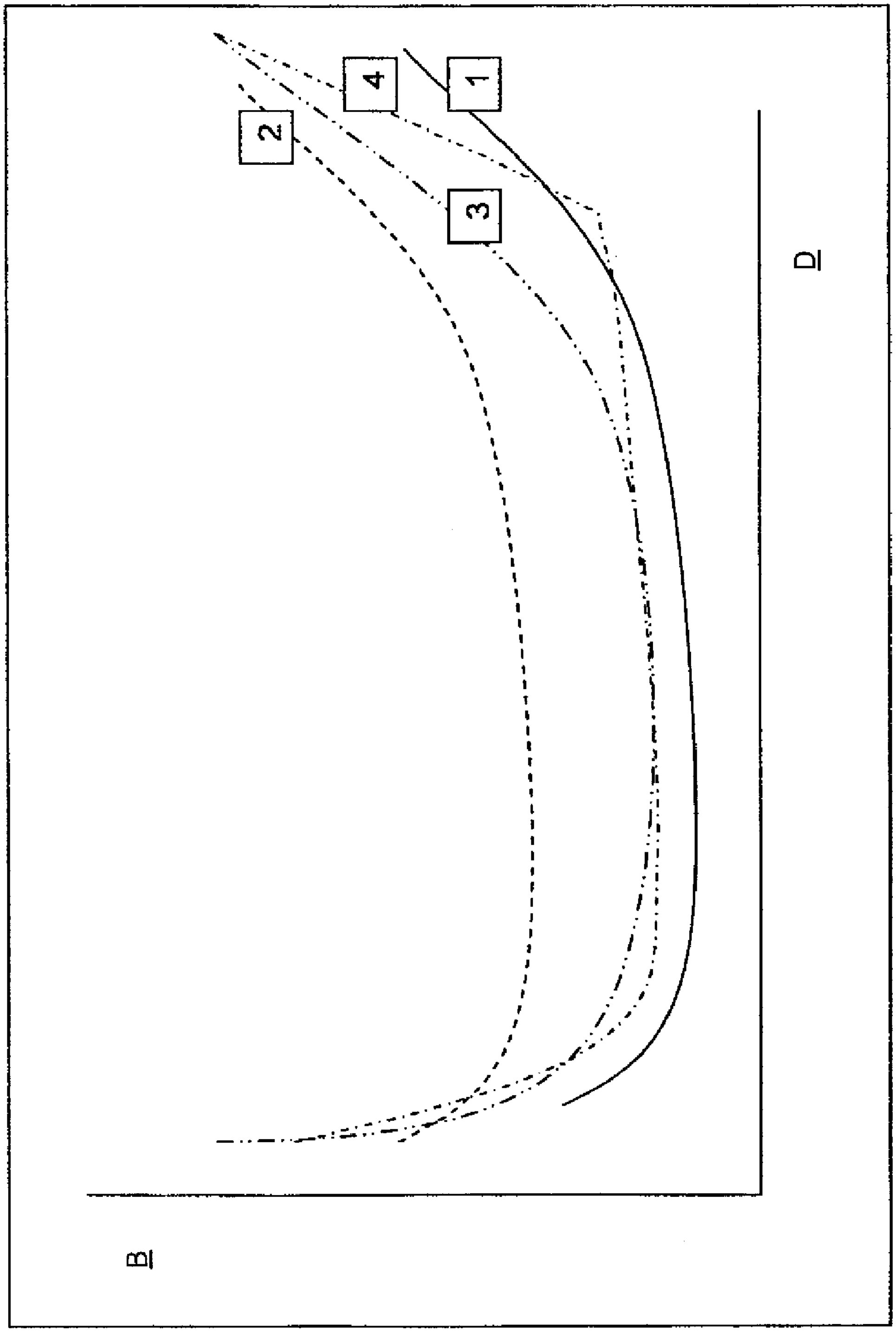

FIG. 6 shows the regulating effects on the fuel characteristic of the diaphragm carburettor 20 which are able to be achieved by means of the compensation path 50. Here, on the vertical axis the ratio (reference B) is entered of the fuel/air mixture provided by the diaphragm carburettor and supplied to a two-stroke engine associated with the diaphragm carburettor and on the horizontal axis the corresponding rotation speed per second (reference D) of the two-stroke engine is entered.

In accordance with the type of construction, each diaphragm carburettor has a fuel characteristic in which the line marked with reference [1] represents the fuel characteristic of a diaphragm carburettor, the regulating diaphragm of which is acted upon on the dry side, i.e. the side facing the compensation chamber, with the ambient air pressure. In a diaphragm carburettor, the regulating diaphragm of which is acted upon on the dry side with the air pressure of the air filter, through this filter compensation the fuel characteristic is as a whole displaced with respect to level (cf. the characteristic marked by reference [2]). The characteristic marked with reference [3] shows that the characteristic of the diaphragm carburettor can be altered by the length of the compensation path. A switchable compensation path additionally makes possible a change dependent on rotation speed, as illustrated by means of the characteristic marked by reference [4].

Figure 2:
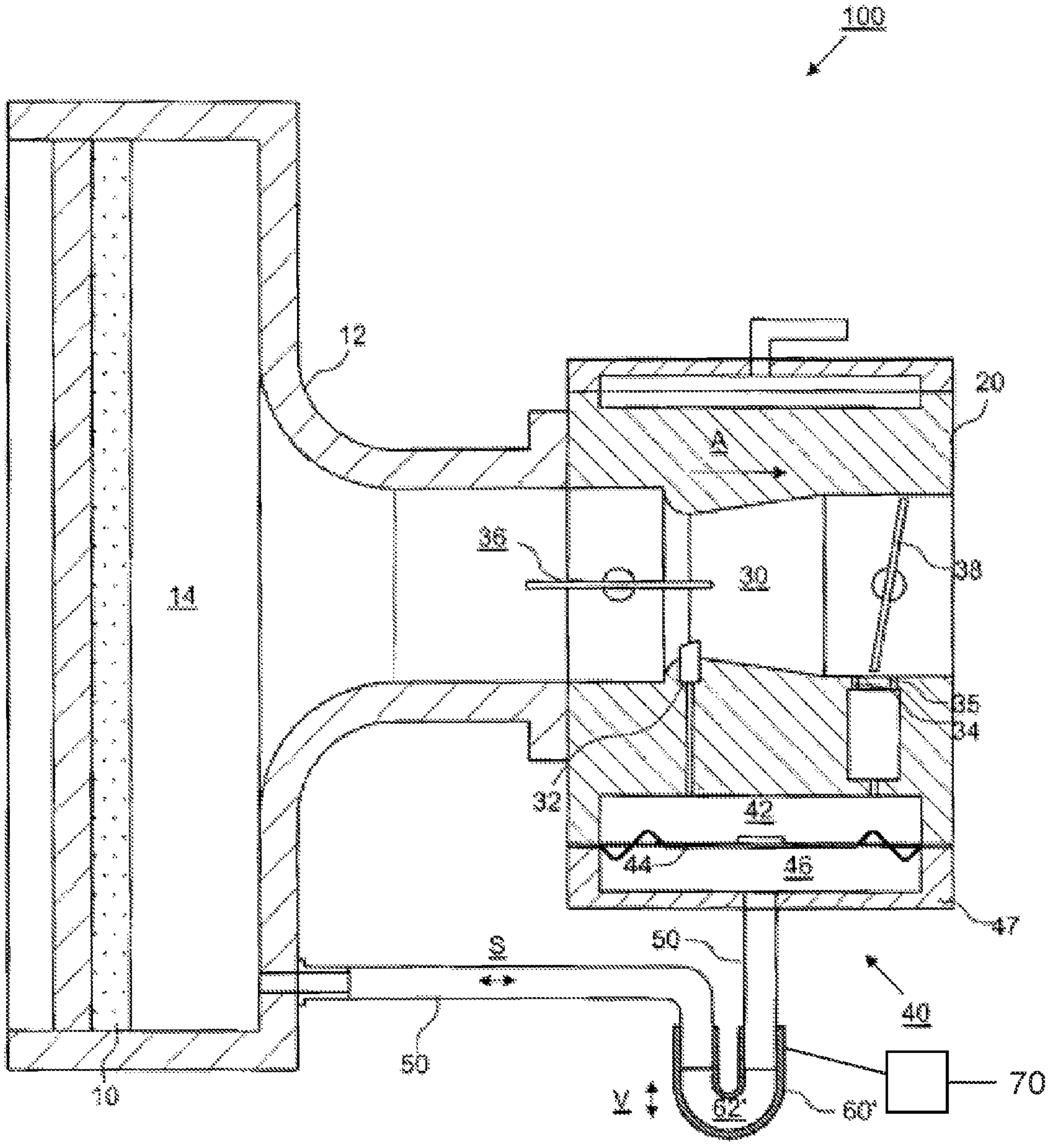
Figure 3:
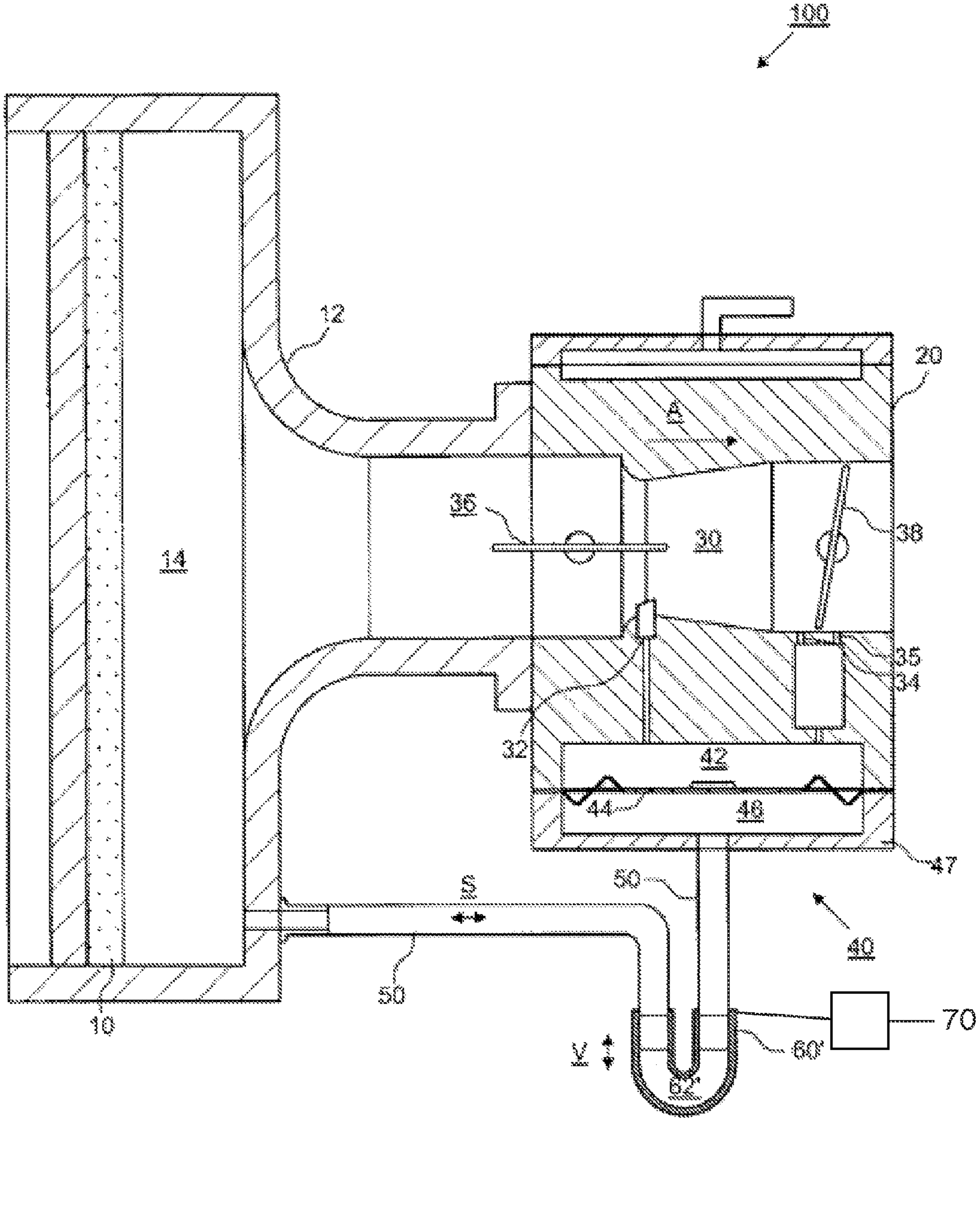

In FIGS. 2 and 3, the arrangement of FIG. 1 is shown with a variable change in length of the compensation path 50, in which the length of the compensation path is able to be altered variably or continuously by means of a control- and/or regulating element 60' belonging to the compensation path 50. The change in length of the compensation path 50 takes place by a relative movement of the control- and/or regulating element 60' towards the compensation path 50 or away from the compensation path 50. Here, a preferably U-shaped path element 62' is

- at least partially displaced over the compensation path 50 or at least partially into the compensation path 50, or
- at least partially moved out from the compensation path 50 or at least partially moved down from the compensation path 50.

The direction of movement of the control- and/or regulating element 60' is marked by means of arrows on both sides with reference V.

Alternatively, it is also conceivable that to alter the dimensioning of the compensation path 50, the compensation path 50 and/or the path element 62' are moved towards each other, for example displaced over each other or in each other, or moved away from each other, for example pushed apart or pulled apart.

Figure 4:
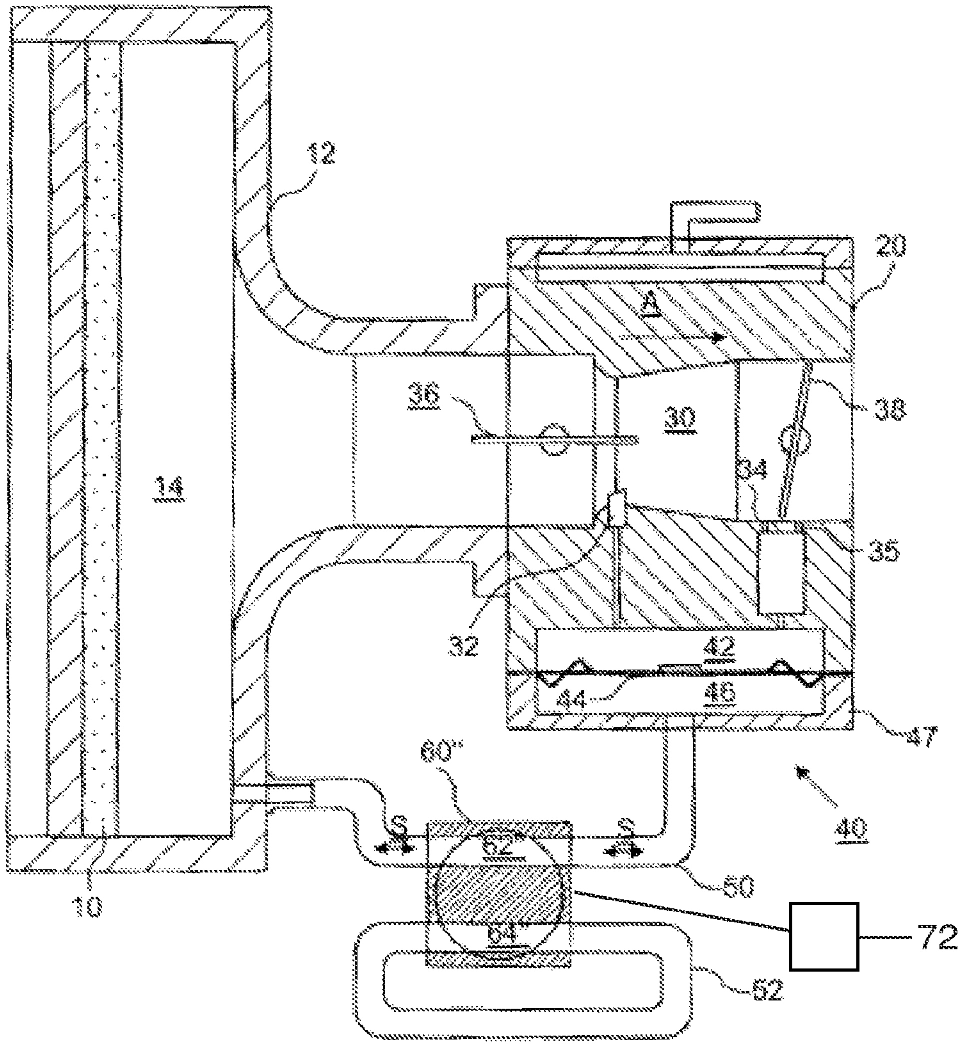
Figure 5:
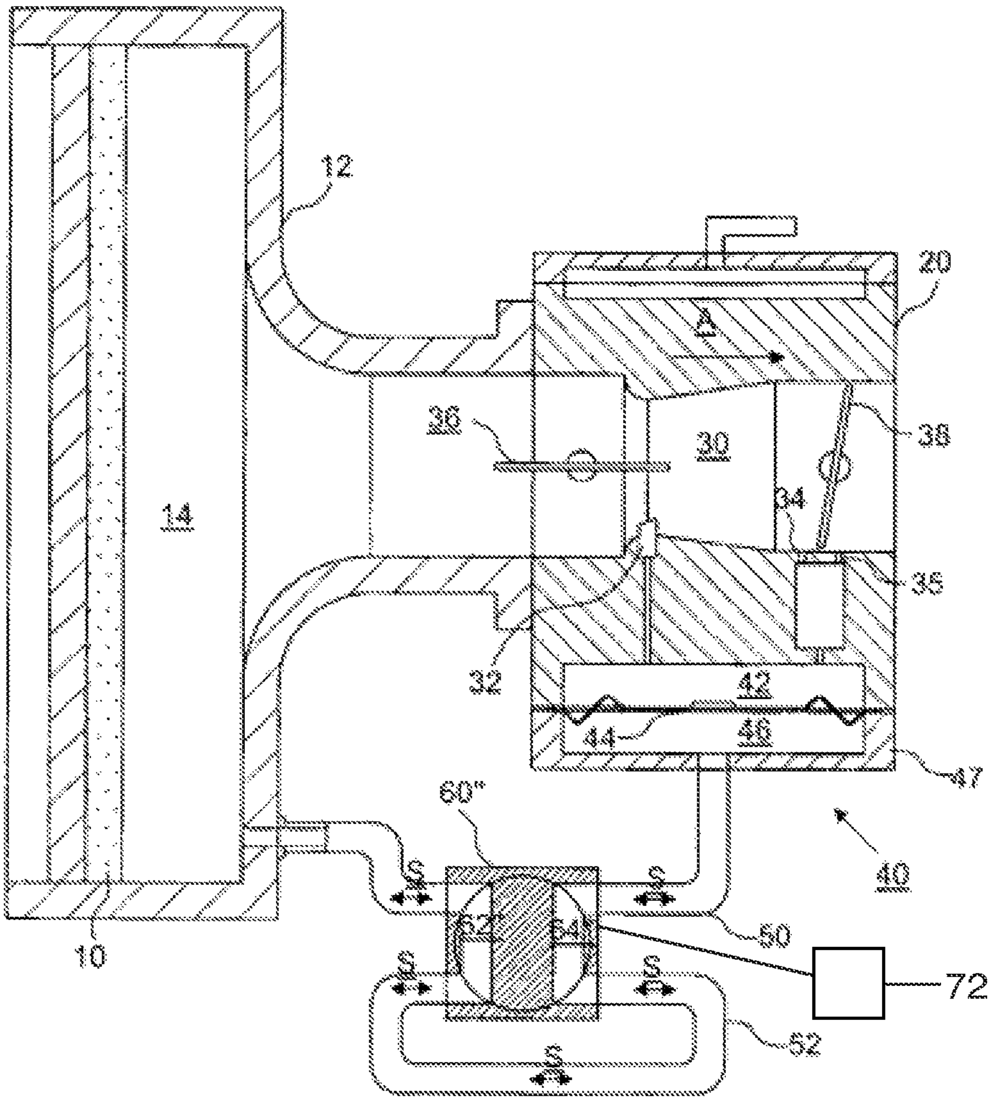

In FIGS. 4 and 5, the arrangement of FIG. 1 is shown with a switchable compensation path 50, in which the length of the compensation path is able to be altered by means of a switching arrangement 60" associated with the compensation path 50.

The switching arrangement 60" has two connection path elements 62", 64", preferably arranged parallel to each other, which cooperate with a further compensation path element 52 such that in a first switching position (cf. FIG. 2) the compensation path 50 is connected with the further compensation path element 52, and in a second switching position (cf. FIG. 3) the compensation path 50 is separated from the further compensation path element 52, in which the change between the switching positions takes place by a rotary movement of the switching arrangement 60.

This switching arrangement 60", like the U-shaped control- and/or regulating element 60', can be regulated in various ways, for example by means of underpressure of a crankcase, dependent on rotation speed by a solenoid valve and/or controlled for example by a sensor, by a throttle valve sensor 70 as a rotation speed- or load signal, by an accelerator throttle by means of a switch or sensor or otherwise. Advantageously, provision can also be made to control the switching arrangement via the ignition control.

It is also possible in line with the present invention to provide the switching arrangement or control 60, 60', 60" so as to be dependent upon a temperature sensor 72. Furthermore, it is also conceivable to represent an altered characteristic with the function according to the invention.

The invention claimed is:

1. An arrangement of at least one air filter and at least one diaphragm carburettor for providing a fuel/air mixture, the diaphragm carburettor connected to a clean-airside of the at least one air filter by at least one suction port, the diaphragm carburettor having a regulating chamber with a fuel chamber connected to the suction port, in which the fuel chamber is charged with underpressure from the suction port and is separated from at least one compensation chamber by at least one regulating diaphragm configured to control fuel supply to the fuel chamber, wherein the compensation chamber is connected the clean air side of the air filter by at least one compensation path, comprising: at least one control and/or regulating element associated with the compensation path, the at least one control and/or regulating element having at least one path element connected to the compensation path and movable relative thereto configured to alter the dimensioning in the length and/or diameter of the compensation path between at least two different stages or switching positions, wherein the compensation path connects the compensation chamber to the clean air side of the air filter in either stage or switching position: characterized in that the control and/or regulating, element is configured so as to alter the dimensioning of the compensation path as a function of frequency and/or amplitude of resonance vibrations occurring in a pressure source and/or as a function of the operating behaviour of the diaphragm carburettor, wherein the operating behaviour comprises the load and/or rotation speed of a two-stroke engine associated with the diaphragm carburettor, the intensity of the underpressure in the suction port and/or the pressure in the pressure source.

2. The arrangement according to claim 1, wherein the at least one path element is configured to alter the dimensioning in the length and/or diameter of the compensation path continuously variably.

3. The arrangement according to claim 1, characterized by at least one control arrangement associated with the path element, the control arrangement comprising at least one throttle valve sensor and/or at least one temperature sensor configured to regulate movement of the path element relative to the compensation path.

4. An arrangement of at least one air filter and at least one diaphragm carburettor for providing a fuel/air mixture, the diaphragm carburettor connected to a clean-airside of the at least one air filter by at least one suction port, the diaphragm carburettor having a regulating chamber with a fuel chamber connected to the suction port, in which the fuel chamber is charged with underpressure from the suction port and is separated from at least one compensation chamber by at least one regulating diaphragm configured to control fuel supply to the fuel chamber, wherein the compensation chamber is connected the clean air side of the air filter by at least one compensation path, comprising:

at least one control and/or regulating element associated with the compensation path, the at least one control and/or regulating element having at least one path element connected to the compensation path and movable relative thereto configured to alter the dimensioning in the length and/or diameter of the compensation path between at least two different stages or switching positions, wherein the corn sensation path connects the compensation chamber to the clean air side of the air filter in either stage or switching position;

wherein the suction port is configured as a Venturi tube and the ratio of the diameter of the compensation path to the smallest diameter of the suction port is a maximum of one-to-twenty and/or the ratio of the length of the compensation path to the smallest diameter of the suction port is at least one-to-eight.

5. An arrangement of at least one air filter and at least one diaphragm carburettor for providing a fuel/air mixture, the diaphragm carburettor connected to a clean-airside of the at least one air filter by at least one suction port, the diaphragm carburettor having a regulating chamber with a fuel chamber connected to the suction port, in which the fuel chamber is charged with underpressure from the suction port and is separated from at least one compensation chamber by at least one regulating diaphragm configured to control fuel supply to the fuel chamber, wherein the compensation chamber is connected the clean air side of the air filter by at least one compensation path, comprising:

at least one control and/or regulating element associated with the compensation path, the at least one control and/or regulating element comprising a U-shaped path element connected to the compensation path, the U-shaped path element configured so as to be at least partially displaceable into or out of the compensation path so as to alter the dimensioning in the length and/or diameter of the compensation path, wherein the compensation path connects the compensation chamber to the clean air side of the air filter whether the U-shaped path element is displaced into or out of the compensation path.

6. The arrangement according to claim 5, characterized by at least one control arrangement associated with the U-shaped path element, the control arrangement comprising at least one throttle valve sensor and/or at least one temperature sensor configured to regulate displacement of the U-shaped path element.

7. The arrangement according to claim 5, characterized in that the control and/or regulating element is configured so as to alter the dimensioning of the compensation path as a function of frequency and/or amplitude of resonance vibrations occurring in a pressure source and/or as a function of the operating behaviour of the diaphragm carburettor, wherein the operating behaviour comprises the load and/or rotation speed of a two-stroke engine associated with the diaphragm carburettor, the intensity of the underpressure in the suction port, and/or the pressure in the pressure source.

8. The arrangement according to claim 5, wherein the suction port is configured as a Venturi tube and the ratio of the diameter of the compensation path to the smallest diameter of the suction port is a maximum of one-to-twenty and/or the ratio of the length of the compensation path to the smallest diameter of the suction port is at least one-to-eight.

9. An arrangement of at least one air filter and at least one diaphragm carburettor for providing a fuel/air mixture, the diaphragm carburettor connected to a clean-airside of the at least one air filter by at least one suction port, the diaphragm carburettor having a regulating chamber with a fuel chamber connected to the suction port, in which the fuel chamber is charged with underpressure from the suction port and is separated from at least one compensation chamber by at least one regulating diaphragm configured to control fuel supply to the fuel chamber, wherein the compensation chamber is connected the clean air side of the air filter by at least one compensation path, comprising: at least one control and/or regulating element associated with the compensation path, the at least one control and/or regulating element comprises a switching arrangement disposed between the compensation path and at least one further compensation path, the switching arrangement configured for rotary movement between a first switching position and at least a second switching position for altering the dimensioning in the length and/or diameter of the compensation path, the first switching position connecting the compensation path to the at least one further compensation path and the second switching position disconnecting the compensation path from the at least one further compensation path, wherein the compensation path connects the compensation chamber to the clean air side of the air filter whether the compensation path is connected to or disconnected from the at least one further compensation path characterized in that the control and/or regulating, element is configured so as to alter the dimensioning of the compensation path as a function of frequency and/or amplitude of resonance vibrations occurring in a pressure source and/or as a function of the operating behaviour of the diaphragm carburettor, wherein the operating behaviour comprises the load and/or rotation speed of a two-stroke engine associated with the diaphragm carburettor, the intensity of the underpressure in the suction port, and/or the pressure in the pressure source.

10. The arrangement according to claim 9, characterized by at least one control arrangement associated with the switching arrangement, the control arrangement comprising at least one throttle valve sensor and/or at least one temperature sensor configured to regulate switching positions.

11. An arrangement of at least one air filter and at least one diaphragm carburettor for providing a fuel/air mixture, the diaphragm carburettor connected to a clean-airside of the at least one air filter by at least one suction port, the diaphragm carburettor having a regulating chamber with a fuel chamber connected to the suction port, in which the fuel chamber is charged with underpressure from the suction port and is separated from at least one compensation chamber by at least one regulating diaphragm configured to control fuel supply to the fuel chamber, wherein the compensation chamber is connected the clean air side of air filter by at least one compensation path, comprising:

at least one control and/or regulating element associated with the compensation path, the at least one control and/or regulating element comprises a switching arrangement disposed between the compensation path and at least one further compensation path, the switching arrangement configured for rotary movement between a first switching position and at least a second switching position for altering the dimensioning in the length and/or diameter of the compensation path, the first switching position connecting the compensation path to the at least one further compensation path and the second switching position disconnecting the compensation path from the at least one further compensation path, wherein the compensation path connects the compensation chamber to the clean air side of the air filter whether the compensation path is connected to or disconnected from the at least one further compensation path;

wherein the suction port is configured as a Venturi tube and the ratio of the diameter of the compensation path to the smallest diameter of the suction port is a maximum of one-to-twenty and/or the ratio of the length of the compensation path to the smallest diameter of the suction port is at least one-to-eight.

* * * * *